(12) United States Patent
Fredriksson (10) Patent No.: US 10,343,481 B2
(45) Date of Patent: Jul. 9, 2019

(54) HYDRAULIC SUSPENSION SYSTEM FOR A VEHICLE, A VEHICLE BEING PROVIDED WITH SUCH A SYSTEM AND A METHOD FOR DAMPING AN ANTI-ROLL FUNCTION OF A VEHICLE

(71) Applicant: VOLVO CONSTRUCTION EQUIPMENT AB, Eskilstuna (SE)

(72) Inventor: Vilhelm Fredriksson, Torshälla (SE)

(73) Assignee: Volvo Construction Equipment AB, Eskilstuna (SE)

( * ) Notice: Subject to any disclaimer, the term of this patent is extended or adjusted under 35 U.S.C. 154(b) by 92 days.

(21) Appl. No.: 15/575,401

(22) PCT Filed: Jun. 5, 2015

(86) PCT No.: PCT/SE2015/050657
§ 371 (c)(1),
(2) Date: Nov. 20, 2017

(87) PCT Pub. No.: WO2016/195560
PCT Pub. Date: Dec. 8, 2016

(65) Prior Publication Data
US 2018/0170142 A1    Jun. 21, 2018

(51) Int. Cl.
*B60G 17/04* (2006.01)
*B60G 21/073* (2006.01)
(Continued)

(52) U.S. Cl.
CPC ............. *B60G 21/073* (2013.01); *B60G 9/00* (2013.01); *B60G 21/026* (2013.01);
(Continued)

(58) Field of Classification Search
CPC ...... B60G 21/073; B60G 9/00; B60G 21/026; B60G 2300/026; B60G 2300/09; B60G 2202/15; B60G 2204/82
(Continued)

(56) References Cited

U.S. PATENT DOCUMENTS 3,736,000 A * 5/1973 Capgras ................ B60G 21/06
                                                                267/64.16
5,271,632 A * 12/1993 Glaser .................... B60G 9/02
                                                                280/124.112
(Continued)

FOREIGN PATENT DOCUMENTS

DE    102008004609 A1    8/2009
DE    102008027134 A1    12/2009
(Continued)

OTHER PUBLICATIONS

International Search Report (dated Feb. 29, 2016) for corresponding International App. PCT/SE2015/050657.

*Primary Examiner* — Toan C To
(74) *Attorney, Agent, or Firm* — WRB-IP LLP (57) ABSTRACT

A hydraulic suspension system is provided for a vehicle, the system including at least a first hydraulic cylinder and a second hydraulic cylinder, each of the hydraulic cylinders including a first chamber and a second chamber, at least four hydraulic accumulators, and at least a first and a second fluid communication path. The first chamber of the first hydraulic cylinder, and the second chamber of the second hydraulic cylinder are in fluid communication with each other by means of the first fluid communication path, and the first chamber of the second hydraulic cylinder and the second chamber of the first hydraulic cylinder are in fluid communication with each other by means of the second fluid communication path, wherein a first hydraulic accumulator
(Continued)

is in fluid communication with the first fluid communication path by means of a first accumulator fluid communication path and a second hydraulic accumulator is in fluid communication with the first fluid communication path by means of a second accumulator fluid communication path, wherein a connection point between the first accumulator fluid communication path and the first fluid communication path is distanced from a connection point between the second accumulator fluid communication path and the first fluid communication path, and wherein a third hydraulic accumulator is in fluid communication with the second fluid communication path by means of a third accumulator fluid communication path and a fourth hydraulic accumulator is in fluid communication with the second fluid communication path by means of a fourth accumulator fluid communication path, wherein a connection point between the third accumulator fluid communication path and the second fluid communication path is distanced from a connection point between the fourth accumulator fluid communication path and the second fluid communication path.

11 Claims, 5 Drawing Sheets

(51) Int. Cl.
  *B60G 9/00* (2006.01)
  *B60G 21/02* (2006.01)
(52) U.S. Cl.
  CPC ...... *B60G 2202/15* (2013.01); *B60G 2204/82* (2013.01); *B60G 2300/026* (2013.01); *B60G 2300/09* (2013.01)

(58) Field of Classification Search
  USPC ...... 280/124.157, 124.158, 124.159, 124.16, 280/124.161
  See application file for complete search history.

(56) References Cited

U.S. PATENT DOCUMENTS

| | | | |
|---|---|---|---|
| 5,447,332 A | 9/1995 | Heyring | |
| 6,196,555 B1* | 3/2001 | Gaibler | B60G 17/005 |
| | | | 280/124.161 |
| 6,318,742 B2* | 11/2001 | Franzini | B60G 21/06 |
| | | | 280/124.106 |
| 6,604,034 B1* | 8/2003 | Speck | B60G 21/073 |
| | | | 280/5.5 |
| 7,240,906 B2 | 7/2007 | Klees | |
| 2004/0113377 A1 | 6/2004 | Klees | |
| 2008/0088107 A1* | 4/2008 | Bitter | B60G 17/005 |
| | | | 280/124.161 |
| 2014/0217692 A1 | 8/2014 | Kato et al. | |
| 2014/0232082 A1* | 8/2014 | Oshita | B60G 17/0162 |
| | | | 280/124.161 |
| 2015/0001825 A1* | 1/2015 | Kazimiers | B60G 9/02 |
| | | | 280/124.112 |
| 2016/0068205 A1* | 3/2016 | Hellholm | B62D 55/112 |
| | | | 180/9.54 |
| 2016/0200164 A1* | 7/2016 | Tabata | B60G 21/0553 |
| | | | 280/5.508 |
| 2018/0354485 A1* | 12/2018 | Adeeb | B60T 13/16 |

FOREIGN PATENT DOCUMENTS

| | | |
|---|---|---|
| JP | 2004217209 A | 8/2004 |
| WO | 9301063 A1 | 1/1993 |

\* cited by examiner

HYDRAULIC SUSPENSION SYSTEM FOR A VEHICLE, A VEHICLE BEING PROVIDED WITH SUCH A SYSTEM AND A METHOD FOR DAMPING AN ANTI-ROLL FUNCTION OF A VEHICLE

BACKGROUND AND SUMMARY

The present invention relates to a hydraulic suspension system for a vehicle. The present invention also relates to a vehicle being provided with a hydraulic suspension system and a method for damping an anti-roll function of a hydraulic suspension system for a vehicle.

The invention is applicable on working machines within the fields of industrial construction machines or construction equipment; in particular articulated haulers. Although the invention will be described with respect to an articulated hauler, the invention is not restricted to this particular vehicle, but may also be used in working machines, such as wheel loaders and backhoe loaders. It may also be used in e.g. trucks, buses or cars.

Vehicles, for example articulated haulers, today are most often provided with suspension systems in order to e.g. provide for a better travel comfort by absorbing e.g. road irregularities, bumps and ledges. An articulated hauler is provided with a dump body or container for carrying and transporting a load. An articulated hauler may be operated with large and heavy loads, for example for transports in connection with road or tunnel buildings, sand pits, mines and similar environments.

In some vehicles, the suspension systems are of hydraulic type. In such systems, a hydraulic suspension cylinder may be provided to each wheel of the vehicle. In order to reduce the body roll of the vehicle during fast cornering or when travelling over road irregularities, anti-roll systems may be provided in relation to the suspension system. For hydraulic suspension systems, the anti-roll systems may be provided by cross-coupling two hydraulic suspension cylinders. Hence, a first chamber of a first hydraulic cylinder may be in fluid communication with a second chamber of a second hydraulic cylinder and a second chamber of the first hydraulic cylinder may then be in fluid communication with a first chamber of the second hydraulic cylinder. The cross-connection then works as a hydraulic anti-roll bar. Such a hydraulic anti-roll bar functions works well for some driving conditions, while it has a tendency to increase the sideways rolling, or lateral vibrations, of the vehicle in other driving conditions, such as when driving over an obstacle with one or more of the wheels of one side of the vehicle.

It is desirable to provide a hydraulic suspension system having both satisfactory anti-roll functionality and satisfactory prevention of lateral vibrations.

The hydraulic suspension system for a vehicle according to an aspect of the invention comprises at least a first hydraulic cylinder and a second hydraulic cylinder, each of said hydraulic cylinders comprising a first chamber and a second chamber, at least four hydraulic accumulators, and at least a first and a second fluid communication path. The first chamber of said first hydraulic cylinder and the second chamber of said second hydraulic cylinder are in fluid communication with each other by means of said first fluid communication path, and the first chamber of said second hydraulic cylinder and the second chamber of said first hydraulic cylinder are in fluid communication with each other by means of said second fluid communication path, wherein a first hydraulic accumulator of said at least four hydraulic accumulators is in fluid communication with said first fluid communication path by means of a first accumulator fluid communication path and a second hydraulic accumulator of said at least four hydraulic accumulators is in fluid communication with said first fluid communication path by means of a second accumulator fluid communication path, wherein a connection point between the first accumulator fluid communication path and the first fluid communication path is distanced from a connection point between the second accumulator fluid communication path and the first fluid communication path, and wherein a third hydraulic accumulator of said at least four hydraulic accumulators is in fluid communication with said second fluid communication path by means of a third accumulator fluid communication path and a fourth hydraulic accumulator of said at least four hydraulic accumulators is in fluid communication with said second fluid communication path by means of a fourth accumulator fluid communication path, wherein a connection point between the third accumulator fluid communication path and the second fluid communication path is distanced from a connection point between the fourth accumulator fluid communication path and the second fluid communication path. The first fluid communication path has at a portion of the extension between the connection point to said first accumulator fluid communication path and the connection point to said second accumulator fluid communication path a cross-sectional area that is smaller than the smallest cross-sectional area of each one of:

the extension between the connection point to said first accumulator fluid communication path and said first chamber of said first hydraulic cylinder,
the extension between the connection point to said second accumulator fluid communication path and said second chamber of said second hydraulic cylinder, and
the first and second accumulator fluid communication paths,
and
the second fluid communication path has at a portion of the extension between the connection point to said third accumulator fluid communication path and the connection point to said fourth accumulator fluid communication path a cross-sectional area that is smaller than the smallest cross-sectional area of each one of:

the extension between the connection point to said third accumulator fluid communication path and said first chamber of said second hydraulic cylinder,
the extension between the connection point between said fourth accumulator fluid communication path and said second chamber of said first hydraulic cylinder, and
the third and fourth accumulator fluid communication fluid paths.

By providing a smaller cross-sectional area at least along a part of the extension of the respective fluid communication paths, as described above, means that in use the maximum flow rate between said first accumulator and said first chamber of said first hydraulic cylinder will be higher than the maximum flow rate between said first accumulator and said second chamber of said second hydraulic cylinder. Similarly, the maximum flow rate between said second accumulator and said second chamber of said second hydraulic cylinder will be higher than the maximum flow rate between said second accumulator and said first chamber of said first hydraulic cylinder, the maximum flow rate between said third accumulator and said first chamber of said second hydraulic cylinder will be higher than the maximum flow rate between said third accumulator and said second chamber of said first hydraulic cylinder, and the maximum flow rate between said fourth accumulator and said second chamber of said first hydraulic cylinder will be higher than the maximum flow rate between said fourth accumulator and said first chamber of said second hydraulic cylinder. Therefore, the fluid in the first hydraulic accumulator will, when a sudden event occurs, be able to travel to the first chamber of the first hydraulic cylinder, the fluid in the second hydraulic accumulator will be able to travel to the second chamber of the second hydraulic cylinder, the fluid in the third hydraulic accumulator will be able to travel to the first chamber of the second hydraulic cylinder and the fluid in the fourth hydraulic accumulator will be able to travel to the second chamber of the first hydraulic cylinder at a higher flow rate, as compared to the other chamber they are in respective fluid communication with. In a similar manner will the fluid in the first chamber of the first hydraulic cylinder be able to travel to the first fluid accumulator at a higher flow rate than what is possible for the fluid in the second chamber of the second hydraulic cylinder, the fluid in the second chamber of the second hydraulic cylinder will be able to travel to the second fluid accumulator at a higher flow rate than what is possible for the fluid in the first chamber of the first hydraulic cylinder, the fluid in the first chamber of the second hydraulic cylinder will be able to travel to the third fluid accumulator at a higher flow rate than what is possible for the fluid in the second chamber of the first hydraulic cylinder; and the fluid in the second chamber of the first hydraulic cylinder will be able to travel to the fourth fluid accumulator at a higher flow rate than what is possible for the fluid in the first chamber of the second hydraulic cylinder. Hence, when a sudden event that affects one or both of the hydraulic cylinders occurs, the reduced cross-sectional areas of the fluid communication paths dampen or delay the cross-coupling between the cylinders. However, as the cross-sectional areas are only reduced, a cross-coupling still exists and fluid will be able to flow in the fluid communication paths to the other one of said chambers even if the flow will be lower than if there would not have been a reduced diameter provided. When events that are not so sudden occur the reduced diameter will be able to handle the required flow rate and therefore, the cross-coupling will continue to work as a hydraulic anti-roll bar in such situations.

The hydraulic suspension system according to this first aspect of the invention is suitable to use as a suspension for a vehicle. The first hydraulic cylinder is adapted to be connected to one side of a vehicle frame, and the second hydraulic cylinder is adapted to be connected to the other side of a vehicle frame.

With fluid communication paths and accumulator fluid communication paths are meant to understand any combination of e.g. hydraulic lines, such as pipes, hose, channels, etc. that may be used alone or in combination to connect at least two hydraulic cylinders and two hydraulic accumulators.

With cross-sectional area of fluid communication paths and accumulator fluid communication paths is meant to understand the flow area of the communication paths, and not the area of the material defining the communication path.

According to one embodiment, each one of the first and second fluid communication paths comprises hoses connecting the respective sides of the cylinders with a respective accumulator block. Each accumulator block is in fluid communication with two hydraulic accumulators and comprises internal channels connecting the accumulators with the hoses. Hence, according to this embodiment, each one of the first and second communication paths comprises a first hose connected to one chamber of a cylinder and the accumulator block, and a second hose connecting the accumulator block with a second chamber of the other cylinder.

There exist different types of hydraulic cylinders, e.g. cylinders with one piston rod and cylinders with two piston rods. In cylinders with only one piston rod, the first chamber may be the piston side chamber and the second chamber may be the piston rod side chamber. In such cylinders, both the area and the volume are usually smaller of the piston rod side chamber than of the piston side chamber, because a part of the volume is taken up by the piston rod. In cylinders with two piston rods, i.e. double-rod cylinders, the volume and area of the first and second chambers may be the same.

According to one embodiment, the system comprises a first and a second flow restriction element, which are arranged at the first and second fluid communication paths and at a position between the connection points to said first and second hydraulic accumulators and the connection points to said third and fourth hydraulic accumulators, respectively.

Providing the smaller cross-sectional areas by first and second flow restriction elements has proven to be a simple and yet efficient manner to provide a reduced diameter and cross-sectional area of the fluid communication paths at the desired positions and thereby achieve the desired effect. Providing the flow restriction elements at the fluid communication paths is beneficial as it provides the desired smaller flow rate without reducing the flow rate between e.g. an accumulator and the chamber of a hydraulic cylinder that the accumulator should not have a restricted communication with.

According to one embodiment, each one of the flow restriction elements is provided at a respective one of a channel in an accumulator block.

According to one embodiment, each one of the flow restriction elements has a diameter of 5-15 mm, more preferably of 8-12 mm and most preferably of 10 mm.

According to one embodiment, the diameter of the remaining parts of the fluid communication paths has a diameter of 20-40 mm, and more preferably of 25-32 mm.

According to one embodiment, the first and second flow restriction elements are fixed restrictions. Fixed restriction elements are advantageous in that they provide a decreased flow rate in a simple and cost-efficient manner.

According to one embodiment, the first and second flow restriction elements are variable restriction valves. Variable restriction valves are advantageous in that they provide for the possibility to adjust or tune the characteristics of the hydraulic suspension system. It is for example conceivable with embodiments in which it is possible to adjust the characteristics before starting to drive. The suspension system may then be tuned for certain known driving conditions. It is also conceivable with embodiments in which it is possible to adjust the flow restrictions elements during driving.

According to one embodiment, the first and third accumulators have a larger volume than the second and fourth accumulators, respectively. The size of the hydraulic accumulators should be balanced against the respective displacement volume of the first chamber and the second chamber of the respective cylinders. As the second chamber in certain cylinders, i.e. cylinders with only one piston rod may be smaller, due to the fact that the piston rod takes up a certain space, it may be beneficial to provide the first and third accumulators with a larger volume than the second and fourth accumulators.

According to one embodiment, the first and third accumulators have the same size, and the first and fourth accumulators have the same size. Providing the same size of the first and third accumulators and of the first and fourth accumulators, respectively, is beneficial as it provides for similar spring characteristics of both hydraulic cylinders.

According to one embodiment, the size of each one of the first and third accumulators is within the range of 4 to 7 liters, preferably about 5 liters. According to one embodiment, the size of each one of the second and fourth accumulators is within the range of 2 to 5 liters, preferably about 3 liters. The volumes specified for the above-mentioned embodiments, have proven to be beneficial in order to achieve good characteristics of the hydraulic suspension system, when used in e.g. an articulated hauler. The vehicle according to the second aspect of the present invention comprises a hydraulic suspension system according to any one of the embodiments of the first aspect. The hydraulic suspension system according to the first aspect of the present invention may beneficially be used in a vehicle such as e.g. a work machine, a truck, a bus or a car.

The piston of each of the hydraulic cylinders may then be connected to a respective one of the wheels of the vehicle, and the piston rod may be connected to the frame of the vehicle. It is however also conceivable with connecting the wheels to a respective piston rod, and the frame of the vehicle to a respective piston.

According to one embodiment, said vehicle is a work machine, such as an articulated hauler. The present invention is beneficial to use in an articulated hauler.

According to one embodiment, said first hydraulic cylinder is connected to the left front wheel of said vehicle, and said second hydraulic cylinder is connected to the right front wheel of said vehicle.

Providing a cross-coupled hydraulic suspension system between the two front wheels of e.g. an articulated hauler is beneficial as it provides for good travel comfort for the driver. A hydraulic suspension system according to the first aspect of the present invention may also be provided at other wheels of the articulated hauler as well.

The method according to a third aspect of the present invention is directed to damping an anti-roll function of a hydraulic suspension system for a vehicle, wherein said hydraulic suspension system comprises at least a first hydraulic cylinder and a second hydraulic cylinder, wherein each of said hydraulic cylinders comprises a first chamber and a second chamber and wherein said hydraulic cylinders are cross-coupled to each other, and said hydraulic suspension system also comprises at least four hydraulic accumulators. The method comprises providing a potential maximum flow rate for the hydraulic fluid between the first chamber of the first hydraulic cylinder and a first one of said hydraulic accumulators that is higher than the potential maximum flow rate between said first accumulator and the second chamber of the second hydraulic cylinder, providing a potential maximum flow rate for the hydraulic fluid between the second chamber of the second hydraulic cylinder and a second one of said hydraulic accumulators that is higher than the potential maximum flow rate between said second accumulator and the first chamber of the first hydraulic cylinder, providing a potential maximum flow rate for the hydraulic fluid between the first chamber of the second hydraulic cylinder and a third one of said hydraulic accumulators that is higher than the potential maximum flow rate between said third accumulator and the second chamber of the first hydraulic cylinder, and providing a potential maximum flow rate for the hydraulic fluid between the second chamber of the first hydraulic cylinder and a fourth one of said hydraulic accumulators that is higher than the potential maximum flow rate between said fourth accumulator and the first chamber of the second hydraulic cylinder.

With a method according to the third aspect of the present invention, the fluid in the first hydraulic accumulator will, when a sudden event occurs, be able to travel to the first chamber of the first hydraulic cylinder, the fluid in the second hydraulic accumulator will be able to travel to the second chamber of the second hydraulic cylinder, the fluid in the third hydraulic accumulator will be able to travel to the first chamber of the second hydraulic cylinder and the fluid in the fourth hydraulic accumulator will be able to travel to the second chamber of the first hydraulic cylinder at a higher flow rate as compared to the other chamber each hydraulic cylinder is connected to. In a similar manner will the fluid in the first chamber of the first hydraulic cylinder be able to travel to the first fluid accumulator at a higher flow rate than what is possible for the fluid in the second chamber of the second hydraulic cylinder; the fluid in the second chamber of the second hydraulic cylinder will be able to travel to the second fluid accumulator at a higher flow rate than what is possible for the fluid in the first chamber of the first hydraulic cylinder; the fluid in the first chamber of the second hydraulic cylinder will be able to travel to the third fluid accumulator at a higher flow rate than what is possible for the fluid in the second chamber of the first hydraulic cylinder; and the fluid in the second chamber of the first hydraulic cylinder will be able to travel to the fourth fluid accumulator at a higher flow rate than what is possible for the fluid in the first chamber of the second hydraulic cylinder. Hence, when a sudden event that affects one or both of the hydraulic cylinders occurs, the reduced cross-sectional areas of the fluid communication paths dampen the cross-coupling between the cylinders. However, as the cross-sectional areas are only reduced, a cross-coupling still exists and fluid will be able to flow in the fluid communication paths to also the other one of said hydraulic cylinders even if the flow will be lower than if there would not have been a reduced diameter provided. When events that are not so sudden occur the reduced diameter will be able to handle the required flow rate and therefore, the cross-coupling will continue to work as a hydraulic anti-roll bar in such situations.

According to one embodiment, said method further comprises providing a first flow restriction element between a first one of said hydraulic accumulators and a second one of said hydraulic accumulators, and a second flow restriction element between a third one of said hydraulic accumulators and a fourth one of said hydraulic accumulators.

The provision of flow restriction elements has proven to be a simple and yet efficient manner in reducing the cross-sectional area, and thereby the maximum potential flow rate, of a fluid connection path.

BRIEF DESCRIPTION OF THE DRAWINGS

The above, as well as additional, features and advantages of the present invention will be better understood through the following illustrative and non-limiting detailed description of exemplary embodiments of the present invention, with reference to the appended drawings, wherein.

DETAILED DESCRIPTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout the description.

Figure 1:
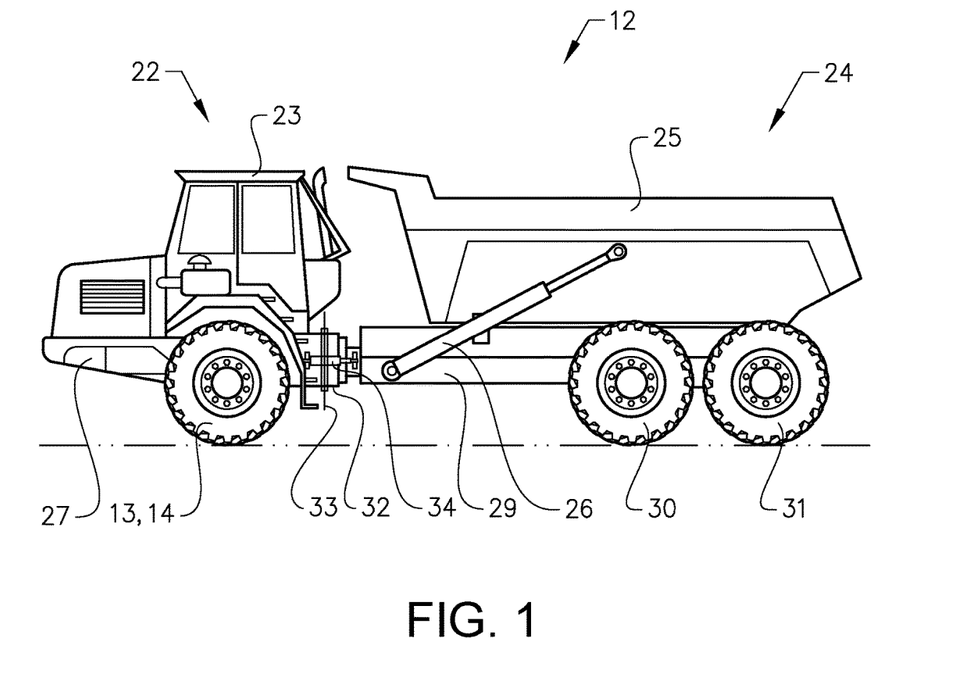
FIG. 1 is a lateral view of an articulated hauler having a dump body for receiving and transporting load.

FIG. 1 is an illustration of a working machine 12 in the form of an articulated hauler having a front section 22 with a cab 23 for an operator and a rear section 24 with a dump body or container 25 for receiving, transporting and tipping a load. The present invention may beneficially be implemented in such a working machine. The front section has a front frame 27 and a pair of wheels 13, 14 (of which only one is visible) suspended from the front frame 27. The rear section 24 has a rear frame 29 and two pair of wheels 30, 31 suspended from the rear frame 29. Only one of the wheels in each pair of wheels is visible in FIG. 1.

For the tipping function the dump body 25 is preferably pivotally connected to the rear frame 29 of the rear section 24 and is tiltable by a tilting means, such as a pair of hydraulic cylinders 26.

The articulated hauler is frame-steered, i.e. there is a pivot joint 32 connecting the front section 22 and the rear section 24 of the articulated hauler 12 such that the front section and the rear section are pivotally connected to each other for pivoting about a substantially vertical axis 33. The articulated hauler preferably comprises a hydraulic system having two hydraulic cylinders 34, steering cylinders, arranged on opposite sides of the articulated hauler for turning the hauler by means of a relative movement of the front section and the rear section.

In addition, the connection between the front section and the rear section can be designed to allow the front and rear section to pivot relative each other about a horizontal pivot axis extending in the longitudinal direction of the articulated hauler.

Between the first pair of wheels 13, 14, a hydraulic suspension system according to a first aspect of the present invention may be provided.

Figure 2:
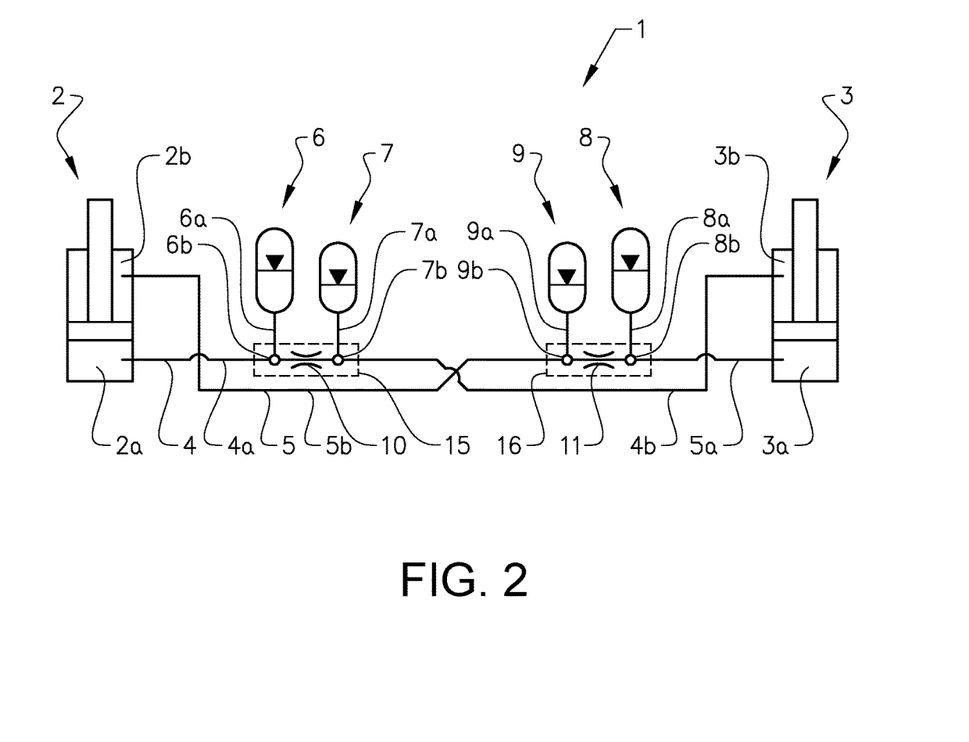
FIG. 2 is a schematic view of a hydraulic suspension system according to an embodiment of the present invention.

One example embodiment of the hydraulic suspension system 1 according to the present invention will now be described in more detail in relation to FIG. 2. The hydraulic suspension system comprises a first hydraulic cylinder 2 and a second hydraulic cylinder 3. Each of said hydraulic cylinders 2, 3 comprises a piston side 2a, 3a and a piston rod side 2b, 3b, respectively. The hydraulic suspension system also comprises four hydraulic accumulators 6, 7, 8, 9 and a first and a second fluid communication path 4, 5. The hydraulic accumulators 6, 7, 8, 9, are of known pre-loaded piston accumulator type and will not be further elaborated upon herein. The piston side 2a of said first hydraulic cylinder 2, the piston rod side 3b of said second hydraulic cylinder 3 and a first hydraulic accumulator 6 and a second hydraulic accumulator 7 of said at least four hydraulic accumulators are in fluid communication with each other by means of said first fluid communication path 4 and a first and second accumulator fluid communication path 6a, 7a. The first and second accumulator fluid communication paths 6a, 7a are connected to the first fluid communication path 4 at a respective connection point 6b, 7b. The piston side 3a of said second hydraulic cylinder 3, the piston rod side 2b of said first hydraulic cylinder 2 and a third hydraulic accumulator 8 and a fourth hydraulic accumulator 9 of said at least four hydraulic accumulators are in fluid communication with each other by means of said second fluid communication path 5 and a third and a fourth accumulator fluid communication path 8a, 9a. The third and fourth accumulator fluid communication paths 8a, 9a are connected to the second fluid communication path 5 at a respective connection point 8b, 9b.

The first and second fluid communication paths 4, 5 comprises a respective first hose 4a, 5a and second hose 4b, 5b. The hoses are connected to a respective cylinder and to accumulator blocks 15, 16, which are more clearly seen in FIG. 3. Each accumulator block 15, 16 comprises the accumulator fluid communication paths 6a, 7a, 8a, 9a in the form of internal channels, and is by means of them connected to two accumulators, i.e. either the first and second accumulators 6, 7 or the third and fourth accumulators 8, 9. The accumulator blocks also comprises internal fluid channels 4c, 5c and fluid ports 4d, 5d, 4e, 5e connecting the accumulator blocks with the respective hoses 4a, 5a, 4b, 5b.

Figure 3:
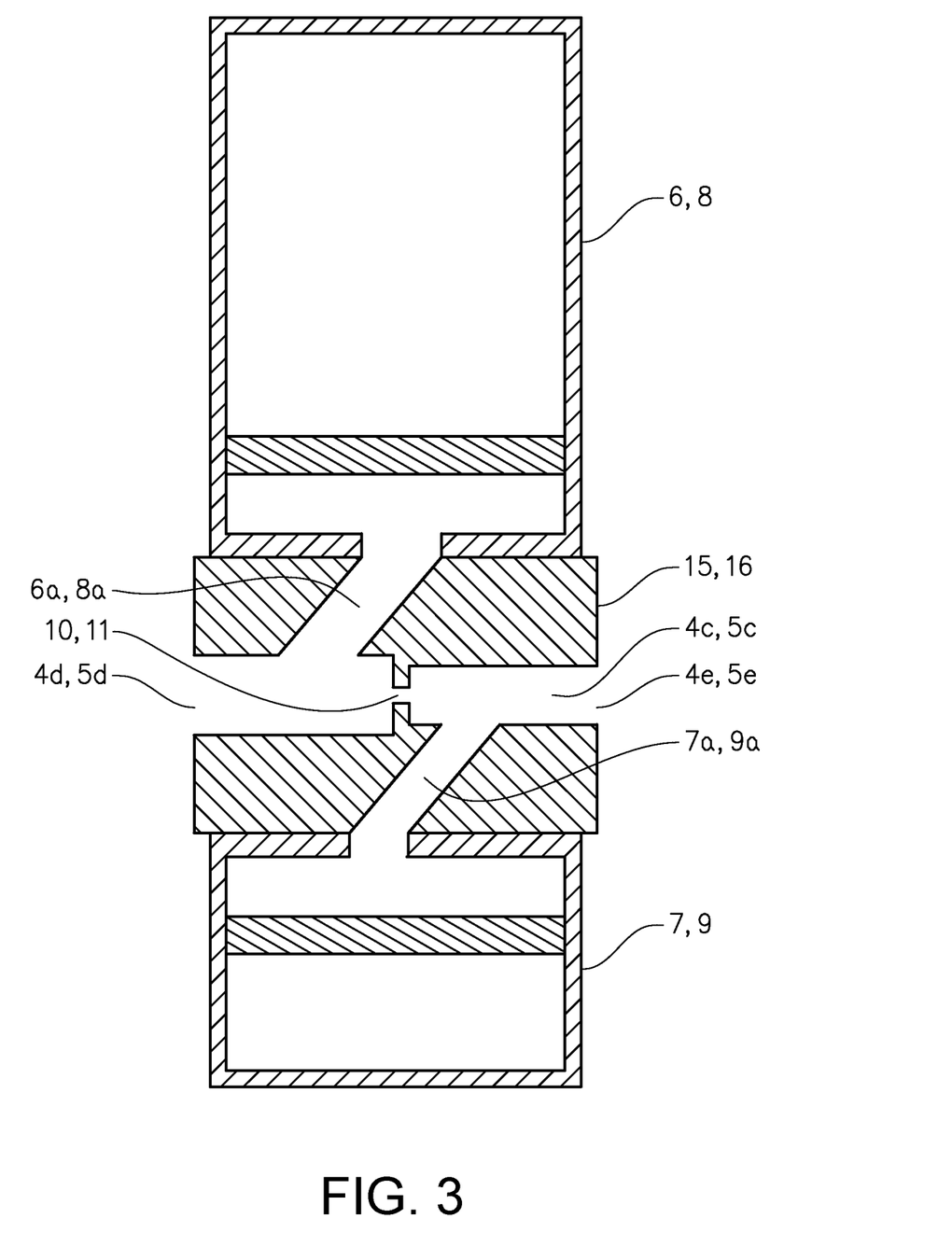
FIG. 3 is a detailed view in cross-section of a part of a hydraulic suspension system according to an embodiment of the present invention.

A first and a second flow restriction element 10, 11 are arranged at the respective first and second fluid communication paths 4, 5 between the connections to the first and second accumulators 6, 7 and the third and fourth accumulators 8, 9 respectively. In this embodiment, the flow restriction elements are provided as orifices at the interior channels 4c, 5c. Hence, the first accumulator 6 is connected to the piston rod side 3b of the second hydraulic cylinder via the first flow restriction element 10, the second accumulator 7 is connected to the piston side 2a of the first hydraulic cylinder via the first flow restriction element 10, the third accumulator 8 is connected to the piston rod side 2b of the first hydraulic cylinder 2 via the second flow restriction element 11 and the fourth accumulator 9 is connected to the piston side 3a of the second hydraulic cylinder via the second restriction element 11. Also, the first accumulator 6 is connected to the piston side 2a of said first hydraulic cylinder 2 without any restriction element limiting the potential flow of fluid, the second accumulator 7 is connected to the piston rod side 3b of said second hydraulic cylinder 3 without any restricting element limiting the potential flow of fluid, the third accumulator 8 is connected to the piston side 3a of said second hydraulic cylinder 3 without any restricting element limiting the potential flow of fluid and the fourth accumulator 9 is connected to the piston rod side 2b of said first hydraulic cylinder 2 without any restricting element limiting the potential flow of fluid.

By this arrangement of the hydraulic cylinders, the accumulators and the flow restriction elements, a hydraulic suspension system is provided in which the potential maximum flow rate between said first accumulator 6 and said piston side 2a of said first hydraulic cylinder 2, said second accumulator 7 and said piston rod side 3b of said second hydraulic cylinder 3, said third accumulator 8 and said piston side 3a of said second hydraulic cylinder 3, said fourth accumulator 9 and said piston rod side 2b of said first hydraulic cylinder 2, respectively, is higher than the potential maximum flow rate between said second accumulator 7 and said piston side 2*a* of said first hydraulic cylinder 2, said first accumulator 6 and said piston rod side 3*b* of said second hydraulic cylinder 3, said fourth accumulator 9 and said piston side 3*a* of said second hydraulic cylinder 3, said third accumulator 8 and said piston rod side 2*b* of said first hydraulic cylinder 2, respectively. The advantages of this will be explained in the following with reference to specific driving conditions.

The first accumulator 6 and the third accumulator 8 each have a volume of approximately 5 liters, and the second accumulator 7 and the fourth accumulator 9 each have a volume of approximately 3 liters.

In the illustrated embodiment, the orifices acting as flow restriction elements 10, 11 have a respective diameter of 10 mm, while the fluid communication paths 4*a*, 6*a* between the first accumulator 6 and the piston side 2*a* of said first cylinder and the fluid communication paths 5*a*, 8*a* between the third accumulator 8 and the piston side 3*a* of the third cylinder 3 have a respective diameter of 32 mm. The fluid communication paths 4*b*, 7*a* between the second accumulator 7 and the piston rod side 3*b* of the second cylinder 3 and the fluid communication paths 5*b*, 9*a* between the fourth accumulator 9 and the piston rod side 2*b* of the first cylinder 2 have a respective diameter of 25 mm. The reason the diameter is smaller for the fluid communication paths between the piston rod sides and the accumulators that is communicating with them without passing any flow restriction element is that less fluid need to be transported between them due to the smaller area of the piston rod side as compared to the area of the piston side of the cylinders. That is also the reason why the second and fourth accumulators 7, 9 have a smaller size than the first and third accumulators 6, 8.

The present invention will now be described in function with reference to specific driving conditions.

Figure 4:
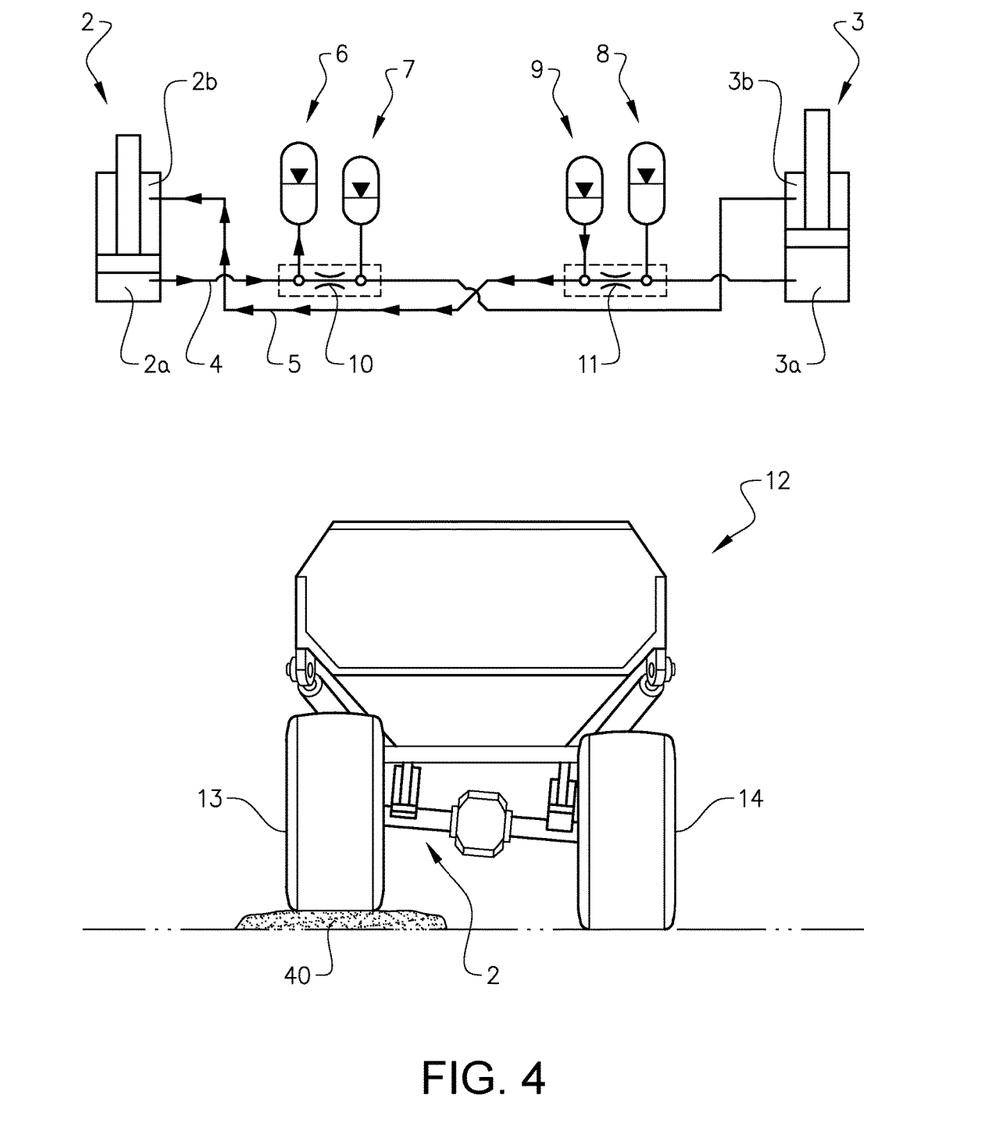
FIG. 4 is a schematic view showing the present invention in use when the vehicle drives over an obstacle with one of its wheels.

FIG. 4 illustrates how the hydraulic suspension system according to the present invention functions to prevent lateral vibrations when driving on uneven roads. In FIG. 4 a vehicle 12 driving over an obstacle 40 with one of its wheels is illustrated. In this figure it is the left wheel 13 that drives over the obstacle 40. As the wheel 13 drives over the obstacle, cylinder 2 is compressed and the obstacle is absorbed in order to provide good comfort for the driver. The hydraulic fluid that is pressed out of the piston side 2*a* of the cylinder 2 flows mainly to the first accumulator 6. Hydraulic fluid from the fourth accumulator 9 flows to the piston rod side 2*b* of the first cylinder 2. As the piston side 2*a* of the first cylinder 2 is in fluid communication with the piston rod side 3*b* of the second cylinder 3, the hydraulic fluid flowing from the piston side 2*a* of the first cylinder 2 when it is compressed could flow to the piston rod side 3*b* of the second cylinder 3. This flow is however restricted by the first flow restriction element 10 and now only a lesser portion of it will reach the piston rod side 3*b* of the second cylinder 3. If the first flow restriction element 10 had not been present, a much larger amount of fluid from the piston side 2*a* of the first cylinder 2 would have flown to the piston rod side 3*b* of the second cylinder 3 and the second cylinder 3 would have been compressed to a much larger degree. How much it would have been compressed is dependent on the relationship between the different areas of the piston side and piston rod side of the cylinders. Such a compression of the second cylinder would have increased the roll, and is therefore desirable to avoid. Hence, with the reduced flow of hydraulic fluid, and the resulting lesser compression, an improved stability of the vehicle is achieved by the present invention.

Figure 5:
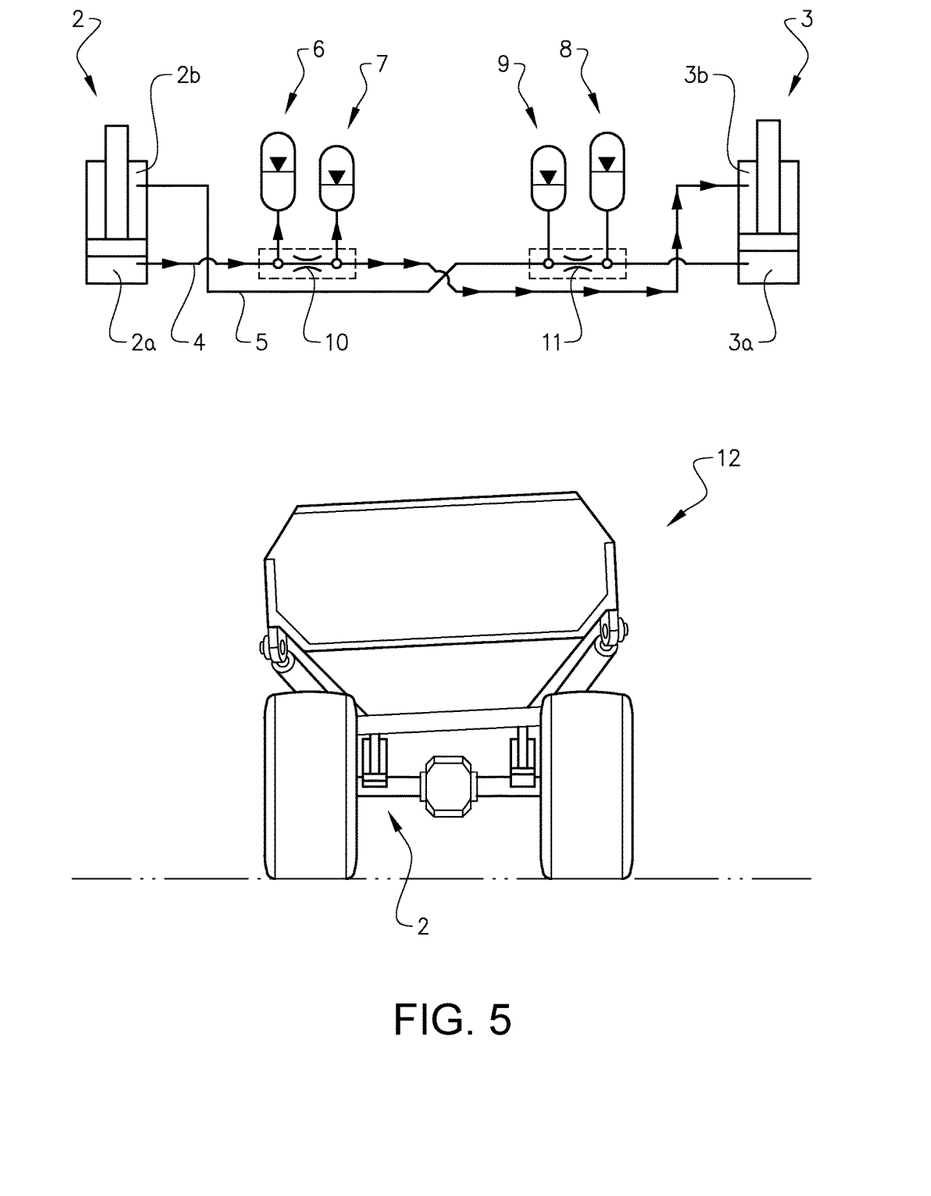
FIG. 5 is a schematic view showing the present invention in use when the vehicle turns left.

A second driving situation is illustrated in FIG. 5 and in this case it is the anti-roll function during a turn to the left of the vehicle 12 that is illustrated. As can be seen in the figure, during a turn to the left, the left cylinder 2 is compressed. In this case a flow of fluid will actually occur between the piston side 2*a* of the first hydraulic cylinder 2 and the piston rod side 3*b* of the second cylinder 3. This flow is important as it compresses the second cylinder 3. Because of the different areas of the piston rod sides 2*b*, 3*b* and the piston sides 2*a*, 3*a* of the respective cylinders 2, 3, the second cylinder 3 may eventually not compress as much as the first cylinder 2. In other words, as the piston rod side has a smaller area than the piston side, the resulting force of the hydraulic fluid will be lower, and therefore the second cylinder will not compress as much as the first cylinder. Some of the fluid will also be transferred to the first accumulator 6 and the second accumulator 7. The compression of the second cylinder 3 restricts the roll of the vehicle and provides a feeling of stability to the driver.

A difference between turning and e.g. driving over an obstacle with one of the wheels is the suddenness of the event and thereby the speed of the flow of the hydraulic fluid in the suspension system. In other words, the flow rate that is required for the suspension system to act properly is lower during a turn of the vehicle as compared to when e.g. one of the wheels drives over an obstacle. The flow restrictions elements 10, 11 are therefore designed, i.e. their cross-sectional areas are chosen, to be large enough to allow the low flow rates created when the vehicle is turning. However, the cross-sectional areas are also chosen to be small enough to limit the higher flow rates provided for by more sudden events.

A person skilled in the art also realizes that the different alternative embodiments and aspects mentioned above may be combined with each other in various suitable embodiments within the scope of the claims. For example it is possible to implement the present invention in any kind of vehicle having a hydraulic suspension system. In the illustrated embodiment, the two front wheels of the articulated hauler are cross-coupled. However, in case it is desired to improve the anti-roll characteristics of also the rear frame of the vehicle, also the other wheel pairs may be provided with a cross-coupled hydraulic suspension system according to the present invention. In other vehicles it may also be beneficial to cross-couple e.g. a front wheel on one side of the vehicle with a back wheel on the other side of the vehicle.

The hydraulic cylinders have been described as comprising a piston side and a piston rod side. It is however also conceivable with double-rod hydraulic cylinders, i.e. cylinders in which a piston rod is attached to each face of the piston head. In such cylinders, the volumes of the first and second chamber can be the same. It is therefore in such embodiments conceivable to provide hydraulic accumulators being of the same size for provision of hydraulic fluid to both the first and second chamber of each cylinder.

Furthermore, the accumulators have been described as piston accumulators. It is however also conceivable with other types of accumulators, such as e.g. diaphragm accumulators.

The first and second flow restriction elements 10, 11 have been described as fixed orifices having reduced diameters as compared to the remaining portions of the respective fluid communication paths. It is however also conceivable with variable restrictions, such as a flow control valve.

Furthermore, any reference signs in the claims should not be construed as limiting the scope.

The invention claimed is:

1. An articulated hauler comprising a hydraulic suspension system, the articulated hauler comprising a front section with a cab for an operator, and a rear section with a receiver for a load and two pairs of wheels, the front section is connected to the rear section by a pivot joint such that the front section and the rear section may pivot relative each other about a horizontal pivot axis extending in the longitudinal direction of the articulated hauler, the system being arranged between a pair of wheels of the front section, the system comprises a first hydraulic cylinder and a second hydraulic cylinder, each of the hydraulic cylinders comprising a first chamber and a second chamber (2b, 3b), at least four hydraulic accumulators, and at least a first and a second fluid communication path, wherein the first chamber of the first hydraulic cylinder and the second chamber of the second hydraulic cylinder are in fluid communication with each other by means of the first fluid communication path, and the first chamber of the second hydraulic cylinder and the second chamber the first hydraulic cylinder are in fluid communication with each other by means of the second fluid communication path, wherein a first hydraulic accumulator of the at least four hydraulic accumulators is in fluid communication with the first fluid communication path by means of a first accumulator fluid communication path and a second hydraulic accumulator of the at least four hydraulic accumulators is in fluid communication with the first fluid communication path by means of a second accumulator fluid communication path, wherein a connection point between the first accumulator fluid communication path and the first fluid communication path is distanced from a connection point between the second accumulator fluid communication path and the first fluid communication path, and wherein a third hydraulic accumulator of the at least four hydraulic accumulators is in fluid communication with the second fluid communication path by means of a third accumulator fluid communication path and a fourth hydraulic accumulator of the at least four hydraulic accumulators is in fluid communication with the second fluid communication path by means of a fourth accumulator fluid communication path, wherein a connection point between the third accumulator fluid communication path and the second fluid communication path is distanced from a connection point between the fourth accumulator fluid communication path and the second fluid communication path wherein the first fluid communication path has at a portion of the extension between the connection point to the first accumulator fluid communication path and the connection point to the second accumulator fluid communication path a cross-sectional area that is smaller than the smallest cross-sectional area of each one of:

the extension between the connection point to the first accumulator fluid communication path and the first chamber of the first hydraulic cylinder, the extension between the connection point to the second accumulator fluid communication path and the second chamber of the second hydraulic cylinder, and the first and second accumulator fluid communication paths (6a, 7a), and the second fluid communication path has at a portion of the extension between the connection pointer to the third accumulator fluid communication path and the connection point to the fourth accumulator fluid communication path a cross-sectional area that is smaller than the smallest cross-sectional area of each one of:

the extension between the connection point to the third accumulator fluid communication path and the first chamber of the second hydraulic cylinder, the extension between the connection point between the fourth accumulator fluid communication path and the second chamber of the first hydraulic cylinder, and the third and fourth accumulator fluid communication fluid paths (8a, 9a).

2. An articulated hauler according to claim 1, wherein the system comprises a first and a second flow restriction element, which are arranged at the first and second fluid communication paths and at a position between the connection points to the first and second accumulators and the connection points to the third and fourth accumulators, respectively.

3. An articulated hauler according to claim 1, wherein the first and second flow restriction elements are fixed restrictions.

4. An articulated hauler according to claim 1, wherein the first and second flow restriction elements are variable restriction valves.

5. An articulated hauler according to claim 1, wherein the first and third hydraulic accumulators, have a larger volume than the second and fourth hydraulic accumulators, respectively.

6. An articulated hauler according to claim 1, wherein the first and third accumulators have the same size, and the first and fourth accumulators the same size.

7. An articulated hauler according to claim 1, wherein the size of each one of the first and third accumulators are within the range of 4 to 7 liters, preferably about 5 liters.

8. An articulated hauler according to claim 1, wherein the size of each one of the second and fourth accumulators are within the range of 2 to 5 liters, preferably about 3 liters.

9. An articulated hauler according to claim 1, wherein the first hydraulic cylinder is connected to the left front wheel of the vehicle, and the second hydraulic cylinder is connected to the right front wheel of the vehicle.

10. A method of damping an anti-roll function of a hydraulic suspension system for an articulated hauler, the articulated hauler comprising a front section with a cab for an operator, and a rear section with a receiver for a load and two pairs of wheels, the front section is connected to the rear section by a pivot joint such that the front section and the rear section may pivot relative each other about a horizontal pivot axis extending in the longitudinal direction of the articulated hauler, the system being arranged between a pair of wheels of the front section, the hydraulic suspension system comprising at least a first hydraulic cylinder and a second hydraulic cylinder, wherein each the hydraulic cylinders comprises a first chamber and a second chamber (2b, 3b), and wherein the hydraulic cylinders (2, 3) are cross-coupled to each other, the hydraulic suspension system also comprising at least four hydraulic accumulators, the method comprising providing a potential maximum flow rate for the hydraulic fluid between the first chamber of the first hydraulic cylinder and a first one of the hydraulic accumulators that is higher than the potential maximum flow rate between the first accumulator and the second chambers of the second hydraulic cylinder, providing a potential maximum flow rate for the hydraulic fluid between the second chamber of the second hydraulic cylinder and a second one of the hydraulic accumulators that is higher than the potential maximum flow rate between the second accumulator and the first chamber of the first hydraulic cylinder, providing a potential maximum flow rate for the hydraulic fluid between the first chamber of the second hydraulic cylinder and a third one of the hydraulic accumulators that is higher than the potential maximum flow rate between the third accumulator and the second chamber of the first hydraulic cylinder, and providing a potential maximum flow rate for the hydraulic fluid between the second chamber of the first hydraulic cylinder and a fourth one of the hydraulic accumulators that is higher than the potential maximum flow rate between the fourth accumulator and the first chamber of the second hydraulic cylinder.

11. A method according to claim 10, the method further comprising providing a first flow restriction element between a first one of the hydraulic accumulators and a second one of the hydraulic accumulators, and a second flow restriction element between a third one of the hydraulic accumulators and a fourth one of the hydraulic accumulators.

* * * * *